United States Patent
Yang et al.

(10) Patent No.: US 11,108,573 B2
(45) Date of Patent: *Aug. 31, 2021

(54) BLOCKCHAIN LEDGER AUTHENTICATION

(71) Applicant: Advanced New Technologies Co., Ltd., Grand Cayman (KY)

(72) Inventors: Xinying Yang, Hangzhou (CN); Yuan Zhang, Hangzhou (CN); Benquan Yu, Hangzhou (CN); Yize Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,748

(22) Filed: Feb. 1, 2021

(65) Prior Publication Data

US 2021/0152376 A1    May 20, 2021

Related U.S. Application Data

(63) Continuation of application No. 16/945,707, filed on Jul. 31, 2020, now Pat. No. 10,911,251, which is a (Continued)

(30) Foreign Application Priority Data

Jun. 3, 2019   (CN) .......................... 201910476244.X (51) Int. Cl.
*H04L 9/32* (2006.01)
*H04L 9/06* (2006.01)

(52) U.S. Cl.
CPC .......... *H04L 9/3297* (2013.01); *H04L 9/0618* (2013.01); *H04L 9/0643* (2013.01);
(Continued)

(58) Field of Classification Search
CPC ... H04L 9/0618; H04L 9/0643; H04L 9/3247; H04L 2209/30; H04L 2209/38
See application file for complete search history.

(56) References Cited

U.S. PATENT DOCUMENTS

| 5,422,953 A | 6/1995 | Fischer |
| 6,408,388 B1 | 6/2002 | Fischer |
| (Continued) | | |

FOREIGN PATENT DOCUMENTS

| CN | 104620253 | 5/2015 |
| CN | 105790954 | 7/2016 |
| (Continued) | | |

OTHER PUBLICATIONS

Cai et al., "Discussion on Bank of England Digital Currency RSCoin," Electronic Finance, Oct. 2016, pp. 78-81 (with English abstract).

(Continued)

*Primary Examiner* — Amare F Tabor
(74) *Attorney, Agent, or Firm* — Fish & Richardson P.C.

(57) ABSTRACT

A computer-implemented method for performing authentication includes: determining, by a database server storing data in a blockchain ledger, a target ledger segment on which time service authentication is to be performed; generating a Merkle tree corresponding to the target ledger segment; determining a root hash of the Merkle tree, the root hash of the Merkle tree being based on a block hash of each data block in a set of one or more data blocks; executing a predetermined time capture process in a trusted execution environment to obtain a trusted time from an interface provided by a trusted time service organization; generating a digital signature for the trusted time and the root hash in
(Continued)

| Field Name | Field Type | Field Description |
|---|---|---|
| Hash | h256 | Hash value of a data block |
| Version | Uint32_t | Version number |
| Number | Uint64_t | Block height |
| Parent_hash | h256 | Hash value of a parent data block |
| Tx_root | h256 | Root hash value of a transacted Merkle tree in a block body |
| Time_stamp | Uint64_t | Timestamp | the trusted execution environment; and generating a time service certificate including the trusted time, the root hash, and the digital signature.

27 Claims, 3 Drawing Sheets

Related U.S. Application Data continuation of application No. 16/803,237, filed on Feb. 27, 2020, now Pat. No. 10,778,452, which is a continuation of application No. PCT/CN2020/071295, filed on Jan. 10, 2020.

(52) U.S. Cl.
CPC ........ *H04L 9/3247* (2013.01); *H04L 2209/30* (2013.01); *H04L 2209/38* (2013.01)

(56) References Cited

U.S. PATENT DOCUMENTS

| | | | |
|---|---|---|---|
| 8,019,988 B2* | 9/2011 | Li | H04L 67/06 713/150 |
| 9,530,010 B2* | 12/2016 | Mashima | G06F 16/2246 |
| 9,705,892 B2 | 7/2017 | Lal et al. | |
| 10,204,341 B2* | 2/2019 | Davis | G06Q 20/065 |
| 10,615,985 B2* | 4/2020 | Lin | H03M 13/154 |
| 2006/0005233 A1 | 1/2006 | Kleinsteiber et al. | |
| 2014/0245020 A1* | 8/2014 | Buldas | H04L 9/3257 713/177 |
| 2015/0363594 A1 | 12/2015 | Hunacek et al. | |
| 2017/0300877 A1* | 10/2017 | Mann | H04L 9/3239 |
| 2018/0097779 A1* | 4/2018 | Karame | G06Q 20/382 |
| 2018/0101844 A1* | 4/2018 | Song | H04L 9/3265 |
| 2018/0330349 A1* | 11/2018 | Uhr | G06Q 20/3825 |
| 2018/0331832 A1* | 11/2018 | Pulsifer | H04L 9/0637 |
| 2018/0349621 A1 | 12/2018 | Schvey et al. | |
| 2019/0007198 A1 | 1/2019 | Neumann et al. | |
| 2019/0147438 A1* | 5/2019 | Micali | H04L 9/3255 705/71 |
| 2019/0182029 A1* | 6/2019 | Yim | H04L 9/30 |
| 2019/0372950 A1 | 12/2019 | McClure | |
| 2020/0110648 A1* | 4/2020 | Yang | H04L 1/1621 |

FOREIGN PATENT DOCUMENTS

| | | |
|---|---|---|
| CN | 107274159 | 10/2017 |
| CN | 108009445 | 5/2018 |
| CN | 108280328 | 7/2018 |
| CN | 108809467 | 11/2018 |
| CN | 109034805 | 12/2018 |
| CN | 109447807 | 3/2019 |
| CN | 109492431 | 3/2019 |
| CN | 109741039 | 5/2019 |
| CN | 110347745 | 10/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Danezis et al., "Centrally Banked Cryptocurrencies," Cornell University arXiv:1505.06895v2, Dec. 2015, 15 pages.

Key Technology and Standard Interpretation of Mobile Finance, 1st ed., Science and Technology Department of the People's Bank of China (ed)., Mar. 2016, p. 98 (with machine translation).

Nakamoto, "Bitcoin: A Peer-to-Peer Electronic Cash System," www.bitcoin.org, 2005, 9 pages.

PCT International Search Report and Written Opinion in International Application No. PCT/CN2020/071295, dated Apr. 8, 2020, 19 pages (with machine translation).

* cited by examiner

| Field Name | Field Type | Field Description |
|---|---|---|
| Hash | h256 | Hash value of a data block |
| Version | Uint32_t | Version number |
| Number | Uint64_t | Block height |
| Parent_hash | h256 | Hash value of a parent data block |
| Tx_root | h256 | Root hash value of a transacted Merkle tree in a block body |
| Time_stamp | Uint64_t | Timestamp |

BLOCKCHAIN LEDGER AUTHENTICATION

CROSS-REFERENCE TO RELATED APPLICATIONS

This application is a continuation of U.S. patent application Ser. No. 16/945,707, filed on Jul. 31, 2020, which is a continuation of U.S. patent application Ser. No. 16/803,237, filed on Feb. 27, 2020, now U.S. Pat. No. 10,778,452, issued Sep. 15, 2020 which is a continuation of PCT Application No. PCT/CN2020/071295, filed on Jan. 10, 2020, which claims priority to Chinese Patent Application No. 201910476244.X, filed on Jun. 3, 2019, and each application is hereby incorporated by reference in its entirety.

TECHNICAL FIELD

Implementations of the present specification relate to the field of information technologies, and in particular, to methods, apparatuses, and devices for performing time service authentication on a blockchain-type ledger that stores data based on a blockchain data structure (e.g., in a form of a blockchain).

BACKGROUND

When data records are centrally stored in a chain ledger, although it is difficult for a service provider to directly modify data, in this case, there is a possibility that a user or an enterprise and the service provider jointly make falsification. For example, to avoid audit, the user and the service provider jointly forge some data blocks to form a pseudo chain that is difficult to be verified.

SUMMARY

Implementations of the present application aim to provide methods to ensure authenticity of a blockchain-type ledger.

To alleviate the previous technical problem, the implementations of the present application are implemented as follows:

A method for performing time service authentication on a blockchain-type ledger is provided, and the method is applied to a centralized database server that stores data by using a blockchain-type ledger and includes: determining a target ledger on which time service authentication needs to be performed; generating a Merkle tree corresponding to the target ledger in a sequence of block heights of data blocks in the target ledger, and determining a root hash of the Merkle tree based on a block hash of each data block; executing a predetermined time capture code in a trusted execution environment to obtain a trusted time, and generating a digital signature for the trusted time and the root hash in the trusted execution environment, where the time capture code is used to obtain a trusted time from an interface provided by a trusted time service organization; and generating a time service certificate including the trusted time, the root hash, and the digital signature.

Correspondingly, an implementation of the present specification further provides an apparatus for performing time service authentication on a blockchain-type ledger, and the apparatus is applied to a centralized database server that stores data by using a blockchain-type ledger, and includes: a determining module, configured to determine a target ledger on which time service authentication needs to be performed; a root hash generating module, configured to generate a Merkle tree corresponding to the target ledger in a sequence of block heights of data blocks in the target ledger, and determine a root hash of the Merkle tree based on a block hash of each data block; a trusted execution module, configured to execute a predetermined time capture code in a trusted execution environment to obtain a trusted time, and generate a digital signature for the trusted time and the root hash in the trusted execution environment, where the time capture code is used to obtain a trusted time from an interface provided by a trusted time service organization; and a generating module, configured to generate a time service certificate including the trusted time, the root hash, and the digital signature.

It can be seen from the implementations of the present application, in the implementations of the present application, a code for capturing a trusted time is executed in a trusted execution environment (TEE) to obtain a trusted time, so as to add a digital signature for a root hash of a target ledger and the trusted time, thereby ensuring reliability of a timestamp in the ledger. In addition, users can verify the timestamp at any time based on a root hash of a data block.

It should be understood that the previous general description and the following detailed description are merely examples and explanations, and are not intended to limit the implementations of the present specification.

In addition, any of the implementations in the present specification implementation does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

A blockchain-type ledger provided in the implementations of the present specification is first described. In a centralized database system in the implementations of the present specification, a data block can be pre-generated in the following method:

A to-be-stored data record is received, and a hash value of each data record is determined. The to-be-stored data record here can be various expense records of an individual user of a client, or can be a service result, an intermediate state, an operation record, etc. that is generated by an application server when the application server executes service logic based on an instruction of a user. Specific service scenarios can include an expense record, an audit log, a supply chain, a government supervision record, a medical record, etc.

When a predetermined block forming condition is satisfied, each data record in a to-be-written data block is determined to generate an $N^{th}$ data block including a hash value of the data block and the data record.

The predetermined block forming condition includes: a quantity of to-be-stored data records reaches a quantity threshold. For example, a new data block is generated each time one thousand data records are received, and the one thousand data records are written into the block. Alternatively, a time interval from a last block forming moment reaches a time threshold. For example, a new data block is generated every five minutes, and data records received in the five minutes are written into the block.

N here is a sequence number of a data block. In other words, in some implementations of the present specification, data blocks are arranged in a form of a blockchain and in a sequence of block forming times, and have a strong time sequence feature. Block heights of the data block are monotonously increased in the sequence of block forming times. A block height can be a sequence number, and in this case, a block height of the $N^{th}$ data block is N. The block height can be generated in another method.

When N=1, that is, the data block in this case is an initial data block, a hash value and a block height of the initial data block are given based on a predetermined method. For example, if the initial data block includes no data record, the hash value is any given hash value, and the block height blknum=0. For another example, a trigger condition for generating the initial data block is consistent with a trigger condition for another data block, but the hash value of the initial data block is determined by performing hashing on all content in the initial data block.

When N>1, because content and a hash value of a previous data block (namely, an $(N-1)^{th}$ data block) are determined, a hash value of a current data block (the $N^{th}$ data block) can be generated based on the hash value of the previous data block. For example, in a feasible method, a hash value of each data record to be written into the N data block is determined, a Merkle tree is generated in an arrangement order of the data records in the block, a root hash value of the Merkle tree is connected with the hash value of the previous data block, and the hash value of the current block is generated by using a hash algorithm again. Alternatively, the hash value of the current block can be generated based on the root hash value of the Merkle tree and some other metadata (for example, a version number and a generation timestamp of the data block). For another example, data records in a block can be connected in a sequence of the data records, and a hash value of an overall data record is obtained by performing hashing on the data records, the hash value of the previous data block is connected with the hash value of the overall data record, and a hash operation is performed on a string obtained through connection to generate the hash value of the data block.

In the previous data block generation method, each data block is determined by using a hash value, and the hash value of the data block is determined by content and a sequence of data records in the data block and a hash value of a previous data block. The user can initiate verification at any time based on the hash value of the data block or the hash value of the data record. Modification to any content in the data block (including modification to the content or the sequence of the data records in the data block) causes inconsistency between a hash value of the data block calculated during verification and a hash value calculated during generation of the data block, leading to a verification failure. As such, the hash value cannot be tampered in a centralized case.

Figure 1:
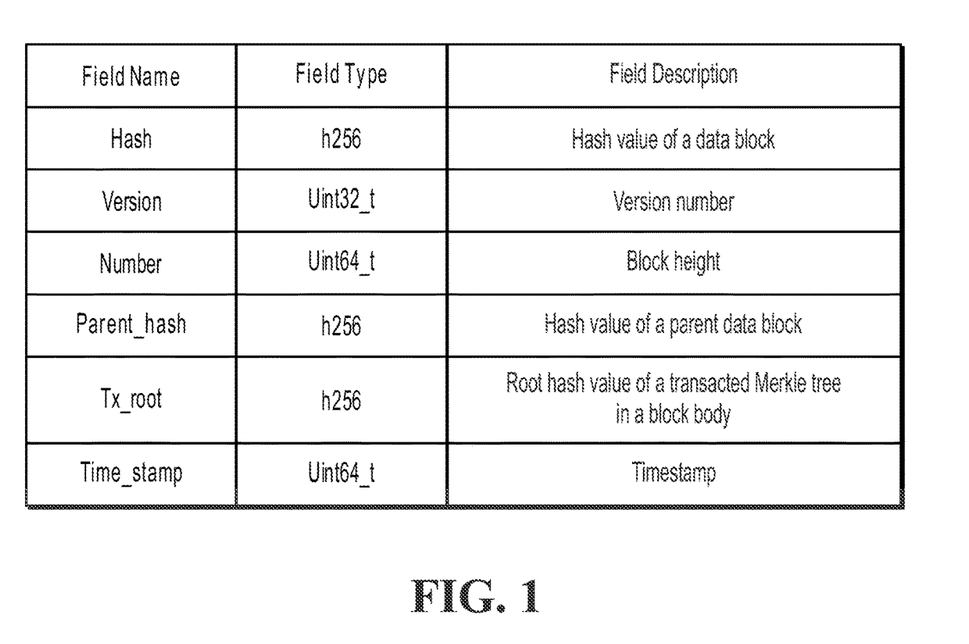
FIG. 1 is a schematic diagram illustrating a block header, according to an implementation of the present specification.

In the implementations of the present specification, a format of the data block can be customized. In an implementation, the format of the data block can be similar to a block format in a blockchain. Each data block includes a block header used to store metadata, and a block body used to store a data record. The block header in the data block can be configured to store, for example, a parent hash, a hash value of the data block, a version number, a root hash of a data record, and a timestamp. As shown in FIG. 1, FIG. 1 is a schematic diagram illustrating a block header, according to an implementation of the present specification. Certainly, a format of the block header can be customized based on a service requirement, and the block header can further include some other information, such as a status array used to describe a status of the data record, and can further be stored in the trusted time provided in the implementations of the present specification, the root hash of the target ledger, etc. The block body is used to store a plain text of the data record or a hash value of the data record.

Figure 2:
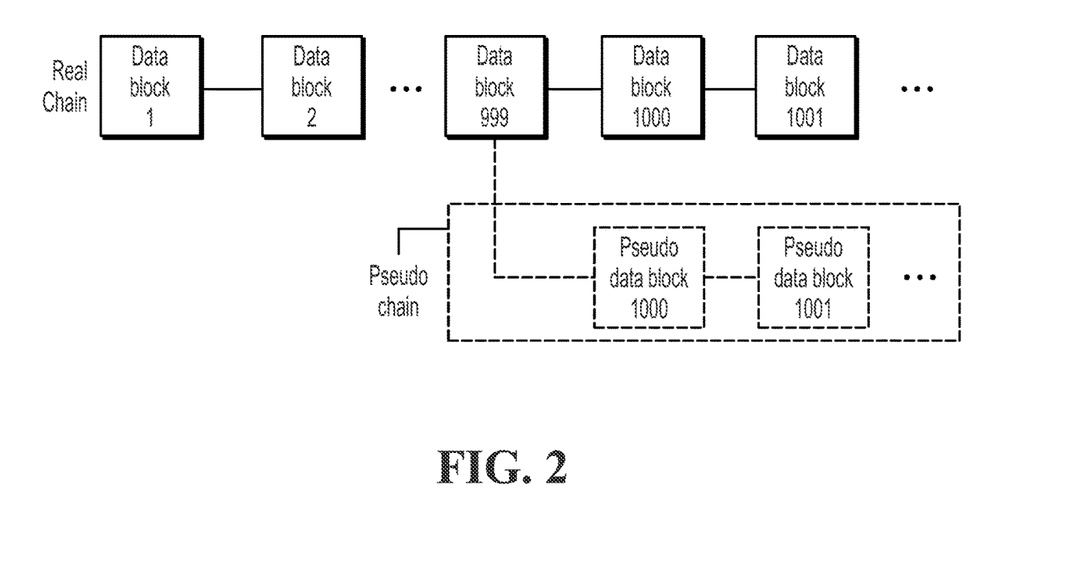
FIG. 2 is a schematic diagram illustrating a pseudo chain, according to an implementation of the present specification.

In the previous method, it is still possible that the user and the service provider jointly forge some data blocks to regenerate a related pseudo chain, to form a new ledger that is partially the same as an old ledger, so as to avoid related audit and verification. As shown in FIG. 2, FIG. 2 is a schematic diagram illustrating a pseudo chain, according to an implementation of the present specification. In a process of generating the pseudo chain, a block forming method of a data block is the same as the previous block forming method.

In this schematic diagram, after a ledger records many data blocks, the service provider considers that a data record in the $1000^{th}$ data block has a problem. Therefore, to avoid exposing the problem, the service provider and a database server joint together to replace data blocks from the $1000^{th}$ data block service provider and regenerate a new $1000^{th}$ data block following the $999^{th}$ data block to form a pseudo chain that is partially the same as the old ledger, so as to avoid verification and audit, and a pseudo chain and a real chain cannot be identified by an external third party.

Figure 3:
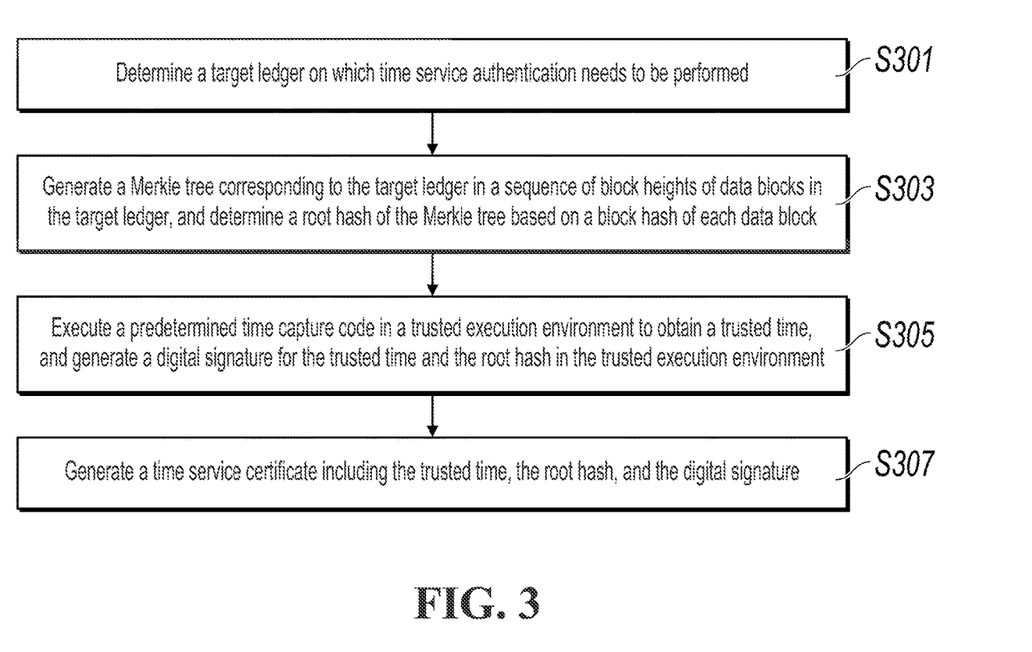
FIG. 3 shows a method for performing time service authentication on a blockchain-type ledger, according to an implementation of the present specification.

Based on this, an implementation of the present specification provides a solution for performing time service authentication on a blockchain-type ledger based on a trusted execution environment (TEE). As shown in FIG. 3, FIG. 3 is a method for performing time service authentication on a blockchain-type ledger, according to an implementation of the present specification. The method is applied to a centralized database server that stores data by using a blockchain-type ledger. The procedure specifically includes the following steps:

S301. Determine a target ledger on which time service authentication needs to be performed.

As described above, in the chain ledger, except the initial data block, each data block includes at least one data record, each data block includes a hash value of the data block determined by using a hash value of a previous data block and a data record included in the data block, and a block height of the data block is monotonically increased in a sequence of block forming times.

Specifically, the service provider first determines, from generated and stored data blocks, a segment of ledger on which time service authentication needs to be performed. The segment of ledger should include at least one data block or a plurality of data blocks whose heights are consecutive. A determining method can be specified based on a user operation. For example, a user initiates a time service instruction, and the instruction includes a starting block height and block quantity on which time service authentication needs to be performed; or a determining method may not be specified by a user, and the service provider automatically performs time service authentication based on predetermined service logic.

For example, in terms of a finest granularity, each data block can apply for a time service. In this method, the root hash of the Merkle tree is a block hash value of the data block. In this method, authenticity of the ledger (that is, each data block) can be protected to a maximum extent. Because a data block has a high output frequency, a hardware requirement for the server is relatively high in this method.

In an optional method, a predetermined time service condition is set, and a time service request is initiated when the predetermined time service condition is satisfied. When newly generated data blocks are considered as data blocks on which time service authentication is to be performed, the predetermined time service condition can be: a quantity of data blocks on which time service authentication is to be performed reaches a quantity threshold, or a time interval from last time service authentication reaches a time threshold.

S303. Generate a Merkle tree corresponding to the target ledger in a sequence of block heights of data blocks in the target ledger, and determine a root hash of the Merkle tree based on a block hash of each data block.

A specific root hash calculation method is a conventional calculation method, and details are omitted here for simplicity. When there is only one data block in the target ledger, the hash value of the data block is the root hash of the Merkle tree in the target ledger.

S305. Execute a predetermined time capture code in a trusted execution environment to obtain a trusted time, and generate a digital signature for the trusted time and the root hash in the trusted execution environment.

The time capture code is a segment of codes that can be disclosed, so that both the public and the user can understand use of the code, thereby ensuring fairness of the trusted time obtained in some implementations of the present specification.

Figure 4:
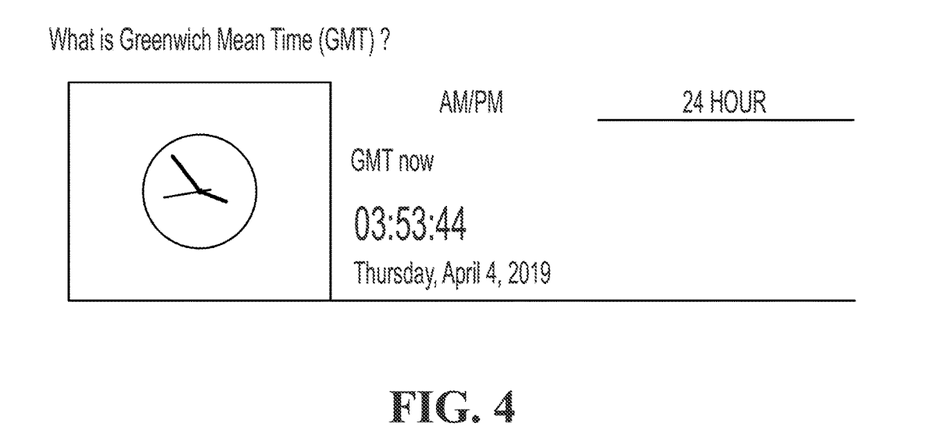
FIG. 4 is a schematic diagram illustrating a time on a webpage provided by Greenwich.

The time capture code is used to obtain a trusted time from a trusted time service organization, and the trusted time is a time provided by an authorized time service organization. For example, a Greenwich standard time is obtained from the webpage https://greenwichmeantime.com. As shown in FIG. 4, FIG. 4 is a schematic diagram illustrating a time on a webpage provided by Greenwich. It is worth-while to note that a time value instead of a screenshot is captured. In addition, the trusted time can be obtained from another related organization, for example, obtained from a time service interface provided by the National Time Service Center.

The trusted execution environment (TEE) is a trusted execution environment that is based on secure extension of CPU hardware and that is isolated from the outside. The TEE is a concept first proposed by the Global Platform to alleviate secure isolation of resources on a mobile device, and is parallel to a trusted and secure execution environment provided by an operating system for an application program. The TrustZone technology of ARM first implements the TEE technology of real commercial use.

With the rapid development of the Internet, a security requirement is increasingly high and is not limited to a mobile device and a cloud device, and even a data center imposes more requirements on the TEE. The concept of the TEE is also developed and expanded at a high speed. The TEE currently mentioned is a more general TEE than the concept originally proposed. For example, server chip manufacturers INTEL, AMD, etc successively release hardware-assisted TEEs and enrich the concept and features of the TEE, which are widely recognized in the industry. The TEE currently mentioned usually refers to this type of hardware-assisted TEE technology. Different from a mobile end, remote access is required for cloud-end access, and users of an end-user device are invisible to a hardware platform. Therefore, the first step of using the TEE is to confirm that the TEE is authentic and trustworthy. Therefore, a remote attestation mechanism is introduced in current TEE technologies and is endorsed by a hardware manufacturer (mainly a CPU manufacturer), and ensures that a user can verify a TEE status by using a digital signature technology. In other words, a result executed in the TEE can obtain a digital signature of the hardware manufacturer.

In addition, a security requirement cannot be satisfied only through secure resource isolation, and data privacy protection is further proposed. Commercial use TEEs including INTEL SGX and AMD SEV also provide memory encryption technologies to restrict trusted hardware inside a CPU, and both bus and memory data are ciphertext to prevent malicious users from snooping. For example, TEE technologies such as INTEL software protection extension (SGX) isolates code execution, remote attestation, secure configuration, secure storage of data, and a trusted path for executing a code. An application program running in the TEE is protected and almost impossible to be accessed by a third party.

The INTEL SGX technology is used as an example. The SGX provides an enclave (enclave), that is, an encrypted trusted execution area in a memory, and the CPU protects data from being stolen. For example, the server uses a CPU supporting the SGX. The server allocates a part of area, namely, an enclave page cache (EPC), by using a newly added processor instruction in a memory, and encrypt data in the EPC by using an encryption engine, namely, a memory encryption engine (MEE), in the CPU. The encrypted content in the EPC is decrypted to plain text only after the content enters the CPU. Therefore, in the SGX, a user may not trust an operating system, a virtual machine monitor (VMM), or even a basic input output system (BIOS), and only needs to trust the CPU to ensure code execution.

In actual applications, a public code is executed in a trusted execution environment to obtain a trusted time, so as to ensure authenticity of the obtained time, and a digital signature can be added for the trusted time and the root hash in the trusted execution environment.

S307. Generate a time service certificate including the trusted time, the root hash, and the digital signature.

In the previous method, the database server can generate a series of time service certificates including trusted times. A trusted time in each time service certificate is ensured by a trusted execution environment signature, and a partial ledger corresponding to the time service certificate can be determined by using a root hash included in the time service certificate. The database server can perform corresponding management and verification based on the trusted time.

For example, when a ledger needs to be audited, the database server can provide a corresponding time service certificate including a trusted timestamp and a signature, and the root hash of the Merkle tree is recalculated based on related information included in the time service certificate. If the calculated root hash of the Merkle tree is consistent with that in the authorized certificate, it can be verified that the certificate is correct. In addition, it can be further determined from the trusted timestamp that a data block corresponding to the certificate cannot be forged in the future, so as to effectively prevent a service provider and a service receiver from jointly manufacturing a ledger including a false timestamp to avoid corresponding audit.

It can be seen from the implementations of the present application that in the implementations of the present application, a code for capturing a trusted time is executed in a trusted execution environment (TEE) to obtain a trusted time, so as to add a digital signature for a root hash of a target ledger and the trusted time, thereby ensuring reliability of a timestamp in the ledger. In addition, users can verify the timestamp at any time based on a root hash of a data block.

In an implementation, the obtained trusted time and the digital signature can be further written into a data block in the target leger, for example, written into a block header of a last data block in the target ledger.

In this method, if each data block is considered as the target ledger, each data block can store a trusted time that corresponds to the data block and that includes a TEE signature. In this case, a root hash is a block hash of the data block (the block hash can be directly obtained based on a data record of the data block and a block hash of a previous data block). In this method, time service authentication is performed on each data block in the ledger, thereby ensuring authenticity of each data block in the ledger.

Figure 5:
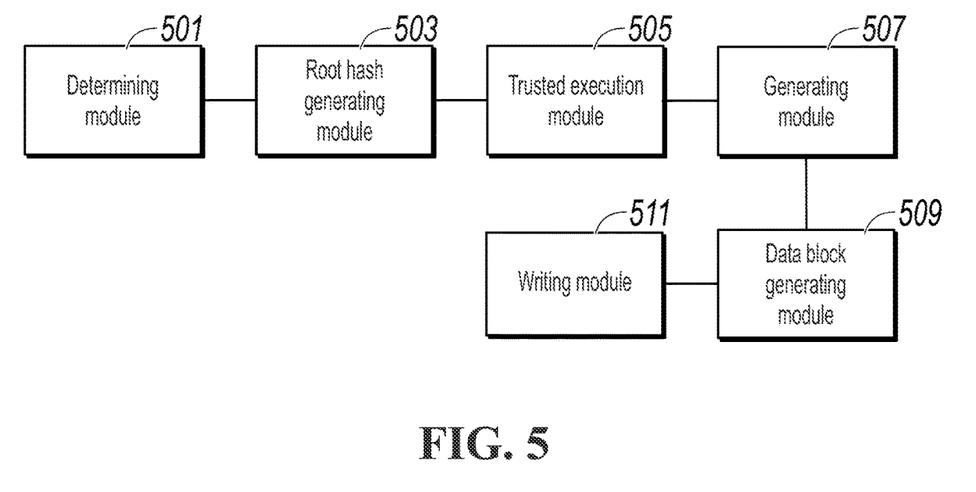
FIG. 5 is a schematic structural diagram illustrating an apparatus for performing time service authentication on a blockchain-type ledger, according to an implementation of the present specification.

Correspondingly, an implementation of the present specification further provides an apparatus for performing time service authentication on a blockchain-type ledger, and the apparatus is applied to a centralized database server that stores data by using a blockchain-type ledger. As shown in FIG. 5, FIG. 5 is a schematic structural diagram illustrating an apparatus for performing time service authentication on a blockchain-type ledger, according to an implementation of the present specification. The apparatus includes: a determining module 501, configured to determine a target ledger on which time service authentication needs to be performed; a root hash generating module 503, configured to generate a Merkle tree corresponding to the target ledger in a sequence of block heights of data blocks in the target ledger, and determine a root hash of the Merkle tree based on a block hash of each data block; a trusted execution module 505, configured to execute a predetermined time capture code in a trusted execution environment to obtain a trusted time, and generate a digital signature for the trusted time and the root hash in the trusted execution environment, where the time capture code is used to obtain a trusted time from an interface provided by a trusted time service organization; and a generating module 507, configured to generate a time service certificate including the trusted time, the root hash, and the digital signature.

Further, the apparatus includes a data block generating module 509, configured to: receive a to-be-stored data record, and determine a hash value of each data record; and when a predetermined block forming condition is satisfied, the determining each data record in a to-be-written data block to generate an $N^{th}$ data block including a hash value of the data block and the data record specifically includes: when N=1, a hash value and a block height of an initial data block are given based on a predetermined method; and when N>1, a hash value of the $N^{th}$ data block is determined based on each data record in the to-be-written data block and a hash value of an $(N-1)^{th}$ data block, to generate the $N^{th}$ data block including the hash value of the $N^{th}$ data block, each data record, and a block forming time of the data block, where a block height of the data block is monotonically increased in a sequence of block forming times.

Further, in the apparatus, the predetermined block forming condition includes: a quantity of to-be-stored data records reaches a quantity threshold, or a time interval from a previous block forming moment reaches a time threshold.

Further, the determining module 501 is configured to: determine each new data block as the target ledger; or determine, based on a starting block height and block quantity included in an instruction of a user, the target ledger on which time service authentication needs to be performed.

Further, the determining module 501 is configured to: use a newly generated ledger that satisfies a timing predetermined condition as the target ledger, where the timing predetermined condition includes: a quantity of newly generated data blocks reaches a quantity threshold, or a time interval from last time service authentication reaches a time threshold.

Further, in the apparatus, the trusted execution environment includes INTEL SGX, AMD SEV, or ARM TrustZone.

Further, the apparatus includes a writing module 511, configured to write the root hash, the trusted time, and the digital signature into a specified data block in the target ledger.

An implementation of the present specification further provides a computer device. The computer device includes at least a memory, a processor, and a computer program that is stored in the memory and that can run on the processor. When executing the program, the processor implements the method for performing time service authentication on a blockchain-type ledger shown in FIG. 3.

Figure 6:
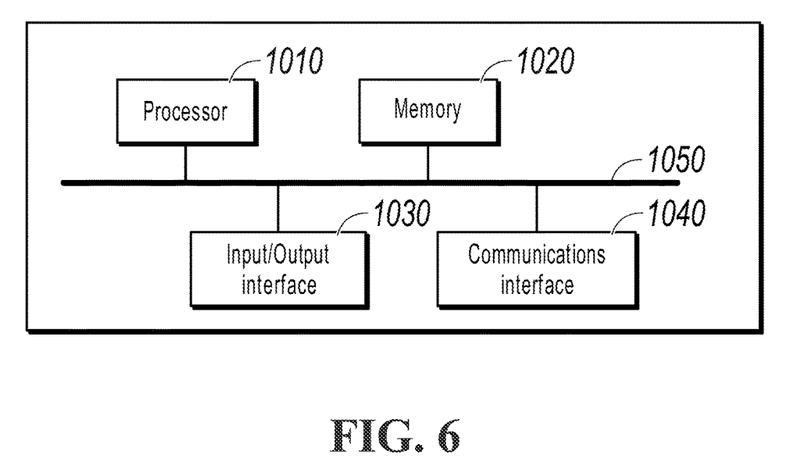
FIG. 6 is a schematic structural diagram illustrating a device used to configure the method in an implementation of the present specification.

FIG. 6 is a schematic structural diagram illustrating a more specific hardware structure of a computing device, according to an implementation of the present specification. The device can include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 can be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 can be implemented in a form of a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module (not shown in the figure) a component in the device, or can be externally connected to the device to provide corresponding functions. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), so as to implement communication and interaction between the device and another device. The communications module can implement communication in a wired method (for example, a USB or a network cable), or can implement communication in a wireless method (for example, a mobile network, WiFi, or Bluetooth).

The bus 1050 includes a channel for transmitting information between components (for example, the processor 1010, the memory 1020, the input/output interface 1030, and the communications interface 1040) of the device.

It is worthwhile to note that even though the previous device shows only the processor 1010, the memory 1020, the input/output interface 1030, the communications interface 1040, and the bus 1050, in a specific implementation process, the device can further include another component required to implement normal operation. In addition, a person skilled in the art can understand that the previous device can include only components required to implement the solutions in the implementations of the present specification, and does not need to include all the components shown in the figure.

An implementation of the present specification further provides a computer readable storage medium. The computer readable storage medium stores a computer program, and when a processor executes the program, the method for performing time service authentication on a blockchain-type ledger shown in FIG. 3 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method for performing authentication, comprising:
    determining, by a database server associated with a blockchain ledger, a target ledger segment on which time service authentication is to be performed;
    generating, by the database server, a Merkle tree corresponding to the target ledger segment, the Merkle tree being based on a set of one or more data blocks in the target ledger segment, wherein the one or more data blocks in the target ledger segment include at least one data block previously stored in the blockchain ledger;
    determining, by the database server, a root hash of the Merkle tree, the root hash of the Merkle tree being based on a block hash of each data block in the set of one or more data blocks;

executing, by the database server, a predetermined time capture process in a trusted execution environment to obtain a trusted time from an interface provided by a trusted time service organization, the trusted time being subsequent to a storage time of the at least one data block previously stored in the blockchain ledger;

generating, by the database server, a digital signature for the trusted time and the root hash in the trusted execution environment;

generating, by the database server, a time service certificate comprising the trusted time, the root hash, and the digital signature; and storing, by the database server, the trusted time and the digital signature in a specified data block of the blockchain ledger.

2. The computer-implemented method of claim 1, further comprising generating, by the database server, a new data block in the blockchain ledger.

3. The computer-implemented method of claim 2, wherein the new data block is generated in response to a predetermined block forming condition, and wherein the predetermined block forming condition comprises:
a quantity of to-be-stored data records reaches a quantity threshold; or
a time interval since the forming of an adjacent previous block reaches a time threshold.

4. The computer-implemented method of claim 1, wherein determining the target ledger segment comprises:
determining a new data block of the blockchain ledger as the target ledger segment; or
determining, based on a starting block height and a block quantity comprised in an instruction of a user, the target ledger segment.

5. The computer-implemented method of claim 1, wherein determining the target ledger segment comprises:
selecting, by the database server, as the target ledger segment, a newly generated ledger segment that satisfies a predetermined time service condition, wherein the predetermined time service condition comprises:
a quantity of newly generated data blocks in the newly generated ledger segment reaches a quantity threshold, or
a time interval since a previous time service authentication reaches a time threshold.

6. The computer-implemented method of claim 1, wherein the trusted execution environment comprises INTEL SGX, AMD SEV, or ARM TrustZone.

7. The computer-implemented method of claim 1, wherein storing the trusted time and the digital signature in the specified data block of the blockchain ledger comprises storing the trusted time and the digital signature in a header of the specified data block.

8. A non-transitory, computer-readable medium storing one or more instructions that, when executed by a computer system, cause the computer system to perform operations comprising:
determining a target ledger segment, of a blockchain ledger, on which time service authentication is to be performed;
generating a Merkle tree corresponding to the target ledger segment, the Merkle tree being based on a set of one or more data blocks in the target ledger segment, wherein the one or more data blocks in the target ledger segment include at least one data block previously stored in the blockchain ledger;
determining a root hash of the Merkle tree, the root hash of the Merkle tree being based on a block hash of each data block in the set of one or more data blocks;
executing a predetermined time capture process in a trusted execution environment to obtain a trusted time from an interface provided by a trusted time service organization, the trusted time being subsequent to a storage time of the at least one data block previously stored in the blockchain ledger;
generating a digital signature for the trusted time and the root hash in the trusted execution environment;
generating a time service certificate comprising the trusted time, the root hash, and the digital signature; and
storing the trusted time and the digital signature in a specified data block of the blockchain ledger.

9. The non-transitory, computer-readable medium of claim 8, wherein the operations further comprise generating a new data block in the blockchain ledger.

10. The non-transitory, computer-readable medium of claim 9, wherein the new data block is generated in response to a predetermined block forming condition, and wherein the predetermined block forming condition comprises:
a quantity of to-be-stored data records reaches a quantity threshold; or
a time interval since the forming of an adjacent previous block reaches a time threshold.

11. The non-transitory, computer-readable medium of claim 8, wherein determining the target ledger segment comprises:
determining a new data block of the blockchain ledger as the target ledger segment; or
determining, based on a starting block height and a block quantity comprised in an instruction of a user, the target ledger segment.

12. The non-transitory, computer-readable medium of claim 8, wherein determining the target ledger segment comprises:
selecting, as the target ledger segment, a newly generated ledger segment that satisfies a predetermined time service condition, wherein the predetermined time service condition comprises:
a quantity of newly generated data blocks in the newly generated ledger segment reaches a quantity threshold, or
a time interval since a previous time service authentication reaches a time threshold.

13. The non-transitory, computer-readable medium of claim 8, wherein the trusted execution environment comprises INTEL SGX, AMD SEV, or ARM TrustZone.

14. The non-transitory, computer-readable medium of claim 8, wherein storing the trusted time and the digital signature in the specified data block of the blockchain ledger comprises storing the trusted time and the digital signature in a header of the specified data block.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
determining a target ledger segment, of a blockchain ledger, on which time service authentication is to be performed;

generating a Merkle tree corresponding to the target ledger segment, the Merkle tree being based on a set of one or more data blocks in the target ledger segment, wherein the one or more data blocks in the target ledger segment include at least one data block previously stored in the blockchain ledger;

determining a root hash of the Merkle tree, the root hash of the Merkle tree being based on a block hash of each data block in the set of one or more data blocks;

executing a predetermined time capture process in a trusted execution environment to obtain a trusted time from an interface provided by a trusted time service organization, the trusted time being after a storage time of the at least one data block previously stored in the blockchain ledger;

generating a digital signature for the trusted time and the root hash in the trusted execution environment;

generating a time service certificate comprising the trusted time, the root hash, and the digital signature; and storing the trusted time and the digital signature in a specified data block of the blockchain ledger.

16. The computer-implemented system of claim 15, wherein the operations further comprise generating a new data block in the blockchain ledger.

17. The computer-implemented system of claim 16, wherein the new data block is generated in response to a predetermined block forming condition, and wherein the predetermined block forming condition comprises:
a quantity of to-be-stored data records reaches a quantity threshold; or
a time interval since the forming of an adjacent previous block reaches a time threshold.

18. The computer-implemented system of claim 15, wherein determining the target ledger segment comprises:
determining a new data block of the blockchain ledger as the target ledger segment; or
determining, based on a starting block height and a block quantity comprised in an instruction of a user, the target ledger segment.

19. The computer-implemented system of claim 15, wherein determining the target ledger segment comprises:

selecting, as the target ledger segment, a newly generated ledger segment that satisfies a predetermined time service condition, wherein the predetermined time service condition comprises:
a quantity of newly generated data blocks in the newly generated ledger segment reaches a quantity threshold, or
a time interval since a previous time service authentication reaches a time threshold.

20. The computer-implemented system of claim 15, wherein the trusted execution environment comprises INTEL SGX, AMD SEV, or ARM TrustZone.

21. The computer-implemented system of claim 15, wherein storing the trusted time and the digital signature in the specified data block of the blockchain ledger comprises storing the trusted time and the digital signature in a header of the specified data block.

22. The computer-implemented method of claim 1, wherein the one or more data blocks comprise a plurality of data blocks, and
wherein the root hash of the Merkle tree is based on a block hash of each data block of the plurality of data blocks.

23. The computer-implemented method of claim 22, wherein the plurality of data blocks have consecutive block heights.

24. The computer-implemented method of claim 1, wherein executing the predetermined time capture process comprises accessing the interface over the Internet.

25. The computer-implemented method of claim 1, comprising providing, by the database server, the time service certificate for auditing of the blockchain ledger.

26. The computer-implemented method of claim 1, wherein the trusted execution environment includes a remote attestation mechanism that is endorsed by a hardware manufacturer.

27. The computer-implemented method of claim 1, wherein the trusted execution environment comprises an encrypted memory portion.

* * * * *